United States Patent
Chavagnat et al.

(10) Patent No.: US 12,038,801 B2
(45) Date of Patent: Jul. 16, 2024

(54) SUPPLY CURRENT CONSUMPTION ACQUISITION SYNCHRONIZED WITH DEBUG DATA TRACE

(71) Applicants: STMicroelectronics (Grenoble 2) SAS, Grenoble (FR); STMicroelectronics (Rousset) SAS, Rousset (FR)

(72) Inventors: Sylvain Chavagnat, Saint Nicolas de Macherin (FR); Simon Valcin, Trets (FR)

(73) Assignee: STMicroelectronics International N.V., Geneva (CH)

( * ) Notice: Subject to any disclaimer, the term of this patent is extended or adjusted under 35 U.S.C. 154(b) by 3 days.

(21) Appl. No.: 18/081,011

(22) Filed: Dec. 14, 2022

(65) Prior Publication Data

US 2024/0201773 A1    Jun. 20, 2024

(51) Int. Cl.
*G06F 1/3234*    (2019.01)

(52) U.S. Cl.
CPC ................................. *G06F 1/3243* (2013.01)

(58) Field of Classification Search
CPC ...................................................... G06F 1/3243
See application file for complete search history.

(56) References Cited

U.S. PATENT DOCUMENTS

| | | | |
|---|---|---|---|
| 7,987,393 B2 * | 7/2011 | Sohm | G06F 11/3636 |
| | | | 714/48 |
| 8,589,927 B2 | 11/2013 | Williams et al. | |
| 10,812,350 B2 | 10/2020 | Bugge et al. | |
| 2016/0349326 A1 | 12/2016 | Grafton et al. | |
| 2022/0026490 A1 * | 1/2022 | Styles | G01R 31/31705 |

FOREIGN PATENT DOCUMENTS

| | | |
|---|---|---|
| CN | 113360440 A | 9/2021 |
| KR | 100869953 B1 | 11/2008 |
| WO | 2022152806 A1 | 7/2022 |

OTHER PUBLICATIONS

Scherer, Balazs, et al: "Trace and Debug Port Based Watchdog Processor," Article in Conference Record—IEEE Instrumentation and Measurement Technology Conference, May 2012, 5 pgs.

* cited by examiner

*Primary Examiner* — Nadeem Iqbal
(74) *Attorney, Agent, or Firm* — Crowe & Dunlevy LLC (57) ABSTRACT

Disclosed herein is a debug system including a host computer, a microcontroller, and a debug probe for interface therebetween for performing debug trace operations. The debug probe samples the current drawn by the microcontroller. The debug probe and host computer cooperate so as to acquire and accurately align trace data and the samples of the current drawn by the microcontroller. Techniques for performing this alignment are described herein and enable for accurate inferences to be drawn about the current drawn by the microcontroller during different program operations.

18 Claims, 5 Drawing Sheets

SUPPLY CURRENT CONSUMPTION ACQUISITION SYNCHRONIZED WITH DEBUG DATA TRACE

TECHNICAL FIELD

This disclosure is related to the field of power consumption monitoring of components within microcontrollers and, in particular, to a debug probe and associated firmware that is able to accurately synchronize a debug trace with a measurement of current draw.

BACKGROUND

System-on-chip devices (SOCs) are now in wide use in electronic devices. SOCs generally include a processor, one or more modules, memory devices, and one or more system busses for communication between the processor, modules, and memory devices. Because multiple modules and their communications occur internally to the chip, access to this information is generally difficult when problems occur in software or hardware. Thus, debugging on these systems is not straightforward. As a result of development of these SOCs, specialized debugging systems have been developed to monitor performance and trace information on the chip. Such systems typically include dedicated hardware or software such as a debug tool and debug software which accesses a processor through serial communications.

Among the various uses of these debugging systems is the attempt to correlate supply current draw (e.g., power consumption) with the debug data from a debug trace. This may be used, for example, to correlate SOC components and functions, processes, programs, and code portions to high power consumption. By making this correlation, suitable targets for power consumption or heat management optimization can be identified.

Figure 1:
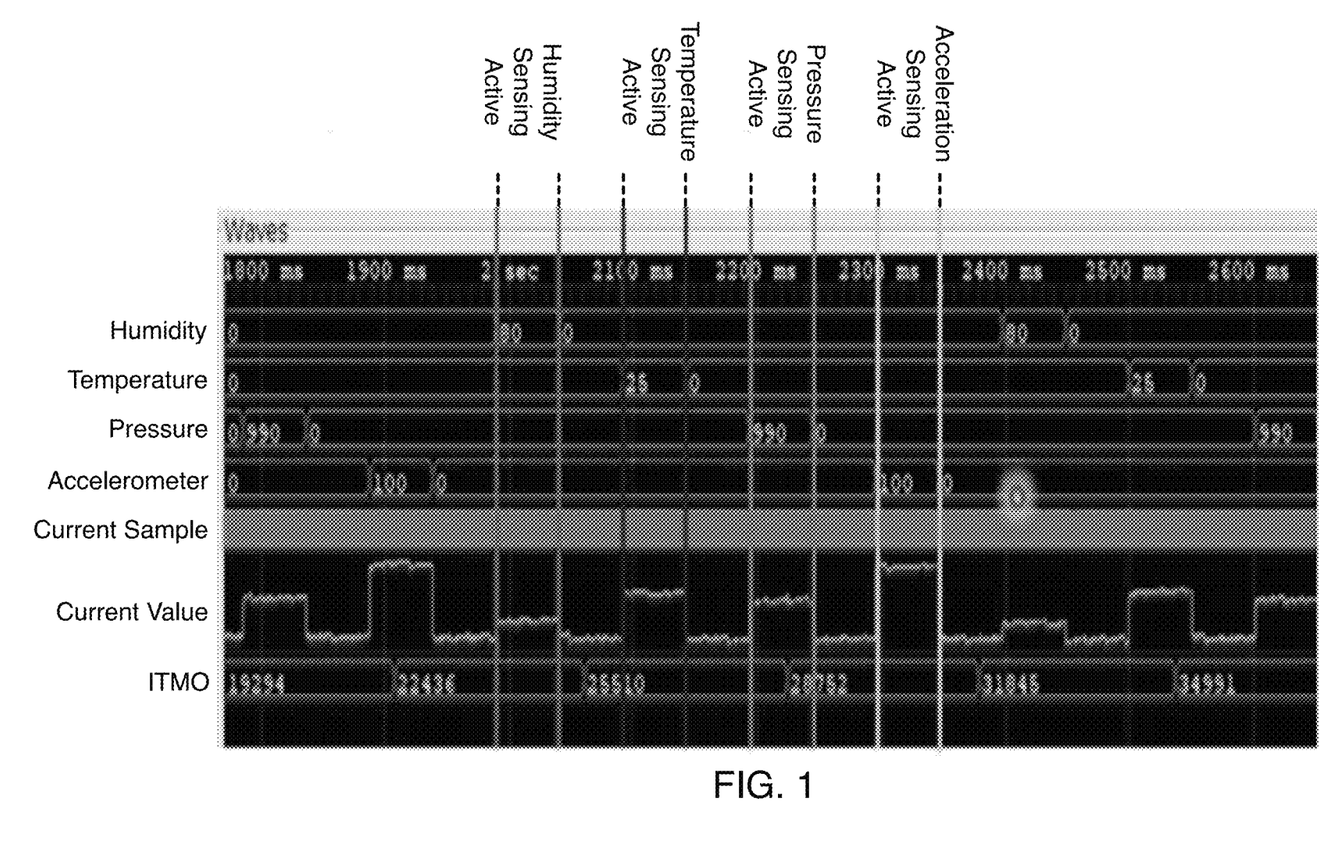
FIG. 1 is a graph showing a rough attempt at alignment between debug trace data and power acquisition samples, as performed by prior art systems.

Conventionally, a host computer in communication with the debug probe aligns current draw and the debug trace in a log which can be displayed to the user. An ideal case is illustrated in FIG. 1, showing current values over time (e.g., samples of the current drawn by a microcontroller including the SOC) and the associated current sample numbers (e.g., the sample number of each current sample) aligned with trace data over time about sensing operations (e.g., humidity, temperature, pressure, accelerometer) from the debug trace. Through this alignment, the power draw of the different types of sensing can be observed. For example, notice the current value during the period when humidity sensing is active (Humidity showing a value of 80) is less than the current values when temperature sensing (Temperature showing a value of 25) and pressure sensing (Pressure showing a value of 990) are active, and is substantially less than the current value when acceleration sensing (Accelerometer showing a value of 100) is active.

From this, it can be seen that acceleration sensing is a good target for power consumption optimization, while humidity sensing is already well optimized. This information helps developers identify where to expend development resources.

Assuming the current values and the trace data can routinely be accurately aligned as in FIG. 1, the conventional debug tools and techniques are effective. However, as stated, FIG. 1 is an ideal case. Using conventional techniques to perform alignment, the current draw and debug traces are often not well aligned by the host computer because the current draw and debug traces are logged as they arrive. For example, the consumption (current values) may be shifted with respect to the "SVCall" function within the trace data. This level of misalignment would be typical. While this would permit general inferences to be made about current consumption and current SOC operation, the misalignment would make specific inferences difficult to draw—the closer the alignment, the more specific the inferences that can be drawn, while the greater the misalignment, the more general the inferences that can be drawn.

In the quest for SOC operating efficiency, the possibility for such misalignment presents an issue. As such, further development into debug probes and the handling of data therefrom is necessary in order to provide for the drawing of accurate specific inferences that can be used to increase operating efficiency of the SOC.

SUMMARY

Disclosed herein is a system, including: a microcontroller including a microprocessor; a debug probe; and a host. The host is configured to, upon startup of the microcontroller, send debug instructions to the debug probe that, when executed by the microcontroller, begin execution of a debug trace within the microcontroller. The debug probe is configured to send the debug instructions to the microcontroller. The microcontroller is configured to execute the debug trace according to the debug instructions to generate trace data, the trace data including trace data time stamps.

The debug probe is further configured to receive a power signal from the host and sample the power signal and provide the power signal to the microcontroller, with each sampling of the power signal occurring during a different power acquisition cycle.

The host is further configured to periodically send synchronization requests to the debug probe.

The debug probe is further configured to, in response to receipt of each synchronization request: retrieve a current power acquisition cycle number; generate an intermediate synchronization request; and send the intermediate synchronization request to the microcontroller.

The microcontroller is further configured to, in response to receipt of each intermediate synchronization request, send a message to the debug probe, the message including a current execution cycle number of the microprocessor and an associated cycle number time stamp.

The debug probe is further configured to: send the trace data to the host; send the messages to the host; and send the sampled power signal to the host.

The host is configured to: determine a trace data time stamp within the trace data where the sampling of the power signal began; derive a frequency of the microprocessor from the trace data; determine a ratio between a sampling rate of the power signal and the frequency of the microprocessor; and align the trace data and the samples of the power signal based upon the ratio and the trace data time stamp within the trace data where the sampling of the power signal began.

The debug probe may include a power acquisition circuit that samples the power signal.

The debug probe may include a protocol manager that retrieves the current power acquisition cycle number, generates the intermediate synchronization request, sends the intermediate synchronization request to the microcontroller, sends the trace data to the host, sends the messages to the host, and sends the sampled power signal to the host.

The protocol manager may send the intermediate synchronization request to the microcontroller via a serial wire debug (SWD) protocol. The microcontroller may send the message to the debug probe via a UART protocol (SWO) and send the trace data to the debug probe via the SWD protocol.

The message may be generated within an instrument trace macrocell (ITM) within the microcontroller.

The debug probe may include a power acquisition circuit that samples the power signal. The microcontroller may be further configured to, upon receipt of each intermediate synchronization request, send a request acknowledgement to the debug probe. The synchronization manager may be further configured to measure a number of power acquisition cycles between sending of each intermediate synchronization request and receipt of each request acknowledgement, and determine a latency based thereupon. The latency may be indicative of accuracy in the alignment between the trace data and the samples of the power signal.

Also disclosed herein is a method of aligning trace data and power consumption data in a debugging system. The method includes: sending debug instructions to a microcontroller within the debug system, the debug instructions, when executed by the microcontroller, begin execution of a debug trace; and receiving a power signal from a host within the debug system; sampling the power signal and provide the power signal to the microcontroller, with each sampling of the power signal occurring during a different power acquisition cycle.

The method further includes in response to receipt of each of a number of periodic synchronization requests: retrieving a current power acquisition cycle number; generating an intermediate synchronization request; and sending the intermediate synchronization request to the microcontroller.

The method further includes: receiving trace data from the microcontroller, the trace data including trace data time stamps; receiving from the microcontroller, in response to the sending of each intermediate synchronization request, a message, the message including a current execution cycle number of a microprocessor within the microcontroller and an associated cycle number time stamp; sending the trace data to the host, sending the messages to the host, and sending the sampled power signal to the host so that the host aligns the trace data and the samples of the power signal based upon a trace data time stamp within the trace data where the sampling of the power signal began and a ratio between a sampling rate of the power signal and a frequency of the microprocessor.

The method may include deriving the frequency of the microprocessor from the trace data.

The method may further include: in response to the sending of each intermediate synchronization request to the microcontroller, receiving a request acknowledgement; measuring a number of power acquisition cycles between the sending of each intermediate synchronization request and receipt of each request acknowledgement, and determining a latency based thereupon. Accuracy in the alignment between the trace data and the samples of the power signal may be determined from the latency.

Also disclosed herein is a method of aligning trace data and power consumption data in a debugging system. The method includes: upon startup of a microcontroller within the debugging system, sending debug instructions from a host within the debugging system to a debug probe within the debugging system that, when executed by the microcontroller, begin execution of a debug trace; transmitting the debug instructions from the debug probe to the microcontroller; executing the debug trace at the microcontroller according to said debug instructions to generate trace data, the trace data including trace data time stamps; receiving a power signal, at the debug probe, from the host; sampling the power signal at the debug probe and providing the power signal to the microcontroller, with each sampling of the power signal occurring during a different power acquisition cycle; and periodically sending synchronization requests from the host to the debug probe.

The method further includes in response to receipt of each synchronization request at the debug probe: retrieving a current power acquisition cycle number; generating an intermediate synchronization request; and sending the intermediate synchronization request from the debug probe to the microcontroller.

The method further includes, in response to receipt of each intermediate synchronization request at the microcontroller, sending a message to the debug probe, the message including a current execution cycle number of a microprocessor within the microcontroller and an associated cycle number time stamp.

The method further includes: sending the trace data from the debug probe to the host; sending the messages from the debug probe to the host; sending the sampled power signal from the debug probe to the host; determining a trace data time stamp within the trace data where the sampling of the power signal began, at the host; deriving a frequency of the microprocessor from the trace data, at the host; determining a ratio between a sampling rate of the power signal and the frequency of the microprocessor, at the host; and aligning the trace data and the samples of the power signal based upon the ratio and the trace data time stamp within the trace data where the sampling of the power signal began, at the host.

The method may further include: upon receipt of each intermediate synchronization request at the microcontroller, sending a request acknowledgement to the debug probe; and measuring a number of power acquisition cycles between sending of each intermediate synchronization request and receipt of each request acknowledgement at the debug probe, and determining a latency based thereupon.

The latency is indicative of accuracy in the alignment between the trace data and the samples of the power signal.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

A debug probe, generally speaking, translates commands received from a host device (e.g., a PC) according to a protocol utilized by a microcontroller. The protocol utilized by the microcontroller may be based on the Joint Test Action Group (JTAG) protocol or based upon the Serial Wire Debug (SWD) protocol, with it being understood that the SWD protocol is specific to microcontrollers with ARM-based central processing units (CPUs) and utilizes two lines/pins for data communications. The two lines/pins utilized by SWD are Serial Wire Data Input Output (SWDIO), over which data is serially communicated, and Serial Wire Clock (SWCLK), over which the clock signal is transmitted. SWD may optionally include a Serial Wire Output (SWO) line/pin, over which the CPU may output specific data in simplex according to a suitable protocol (e.g., Manchester, Universal Asynchronous Receiver Transmitter (UART)).

Real-time debugging (as opposed to breakpoint or single-step debugging) is commonly performed in cases where a processor cannot be stopped or a system crash would occur, or in cases where characteristics of the microcontroller (e.g., power consumption) are to observed during real-time operation. A debug "trace" follows a program's flow and data progression as it is executed by the microcontroller. An on-chip Instrument Trace Macrocell (ITM) or Embedded Trace Macrocell (ETM) may transmit the trace directly to the debug probe through the SWD, or may buffer the trace and then the buffered trace is transmitted to the debug probe. The debug probe in turn provides the trace to the host device.

Figure 2:
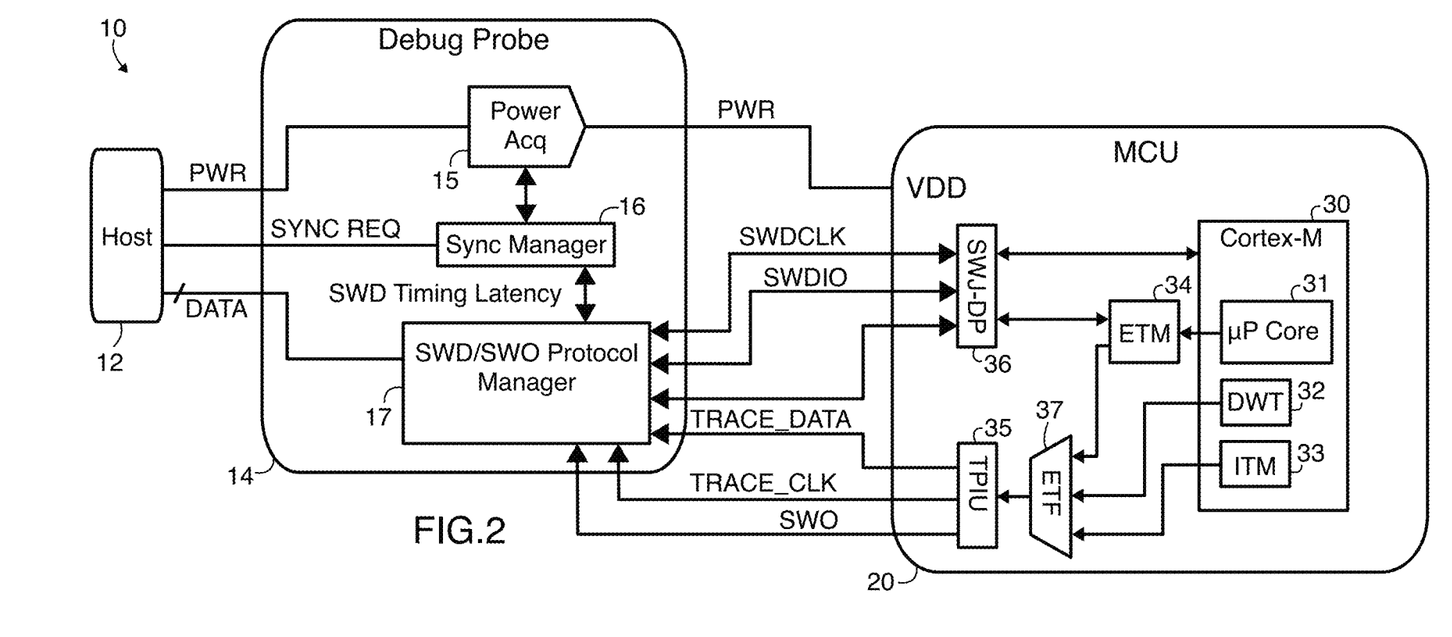
FIG. 2 is a block diagram of a debugging system described herein.

As explained earlier herein, it is desired for the trace data to be synchronized with measures of current draw. Now described with initial reference to FIG. 2 is a debugging system including a host device 12, debug probe 14, and microcontroller (MCU) 20, designed so as to provide for synchronization between trace data (SWDIO, SWO) and measures of current draw (PWR).

The host device 12 may be, for example, a computer, and provides a power output PWR to the debug probe 14.

The debug probe 14 includes a power acquisition circuit 15 that receives the power output PWR from the host computer 12 and provides it to the microcontroller 20 while sampling the power consumed by the microcontroller 20. A power acquisition cycle is the period during which a single sample of the output power PWR is sampled. Note that the sampling rate of the output power PWR is different than the data transmission rate of trace data (SWDIO, SWO).

The debug probe 14 also includes a synchronization manager 16 that receives synchronization requests SYNC REQ from the host computer 12 (the SYNC REQs to be explained in detail below) and is in bidirectional communications with the power acquisition circuit 15 and a protocol manager 17. The protocol manager 17 receives the SWDIO data and SWO data, as well as the clock SWCLK and provides output therefrom to the host computer 12. The protocol manager 17 also receives the trace data TRACE DATA and trace clock TRACE_CLK and provides output therefrom to the host computer 12.

The microcontroller 20 includes an ARM Cortex-M based microprocessor 30, such as a Cortex-M0, Cortex-M0+, Cortex-M1, Cortex-M3, Cortex-M4, Cortex-M7, Cortex-M23, Cortex-M33, Cortex-M35P, Cortex-M55, Cortex-M85, etc.

The microprocessor 30 includes at least one processing core 31, a data watchpoint and trace unit (DWT) 32, and an instrumentation trace macrocell (ITM) 33. The microcontroller 20 includes, external to the microprocessor 30, an embedded trace macrocell (ETM) 34, a trace funnel (ETF) 37, a trace port interface unit (TPIU) 35, and a CoreSight debug port (SWJ-DP, enabling communication via JTAG or SWD) 36.

In general, in operation, trace information is generated from the ETM 34, ITM 33, and DWT 32, and then collected by the trace funnel ETF 37. The TPIU 35 formats the data from these trace sources into packets and sends that data to the protocol manager 17 of the debug probe 14. The ITM 33 has a capability to provide a "printf" style console message interface to the debug probe 14, for example via SWO. The ITM 33 also transfers the messages of the DWT 32, and the ITM 33 can generate timestamp packets which are inserted into the trace stream. The DWT 32 has multiple functionalities and provides profiling and timing verification, and may trigger the ETM 34.

The ETM 34 is used for providing instruction traces. To reduce the amount of data generated, the ETM 34 does not always output precisely what addresses the processing core 31 has reached/executed. The ETM 34 may output information about program flow, such as how many instructions were executed or skipped since the last message, and may output full addresses, or changes in address changes.

The ETM 34 outputs are routed to the TPIU 35, which transmits them to the protocol manager 17 of the debug probe 14. The TPIU 35 may support two output modes, a double data rate clocked mode, using a parallel data output port with clock speed equal to the half of the system core clock and with a port width up to 4-bit (in the case of Cortex™-M3 or M4 core microcontrollers, while other microcontroller series may differ) and a SWV (Serial Wire Viewer) mode, using single-bit UART-like output through SWO.

Figure 5:
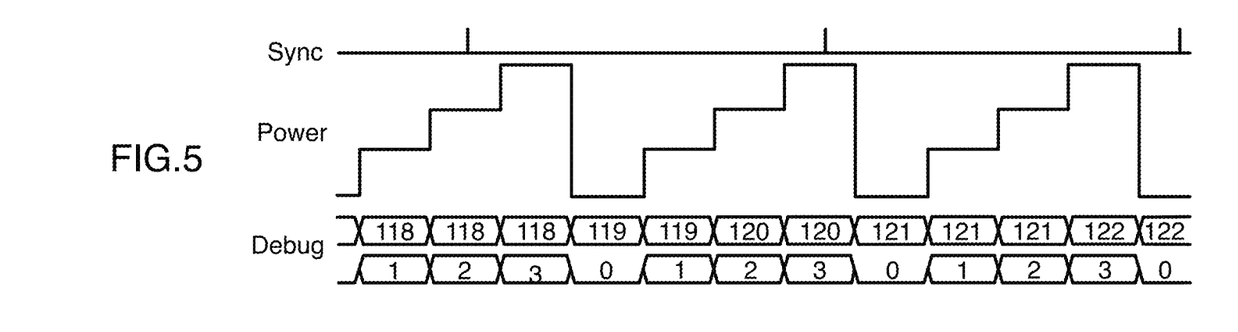
FIG. 5 is a graph showing the precise alignment between debug trace data and power acquisition samples achieved by the debugging system of FIG. 2.

Operation for the trace data to be synchronized with measures of current draw is as follows. Beginning at the start of operation, the host computer 12 instructs the debug probe 14 to send instructions to the microcontroller 20 to begin performing a debug trace, with a debug trace time stamp being enabled. These instructions are sent from the host computer 12 to the protocol manager 17 within the microcontroller 20, which in turn communicates the instructions to the debug port 36 via the SWDIO pin. The instructions are in turn written to the ITM 33, configuring the debug trace. The debug trace data flows from the DWT 32 to the ITM 33, to the TPIU 35, for transmission to the protocol manager 17 of the debug probe 14 over the SWO pin. The protocol manager 17 communicates the trace data packets to the host 12, with each trace data packet including the current debug trace time stamp. This debug trace operation is begun first, as can be seen in FIG. 5.

The host computer 12 then begins to periodically (e.g., every 100 ms) send synchronization requests SYNC REQ to the synchronization manager 16 of the debug probe 14, and the synchronization manager 16 retrieves the current power acquisition cycle number from the power acquisition circuit 15—each sample of PWR is sequentially numbered and the current power acquisition cycle number is the number of the current sample of PWR.

The synchronization manager 16 in turn sends the current power acquisition cycle number to the protocol manager 17, which assembles a synchronization request (including the current power acquisition cycle number) and transmits it to the debug port 16 within the microcontroller 20 via the SWDIO pin. Upon receipt of each synchronization request by the debug port 36, a request acknowledgement is sent back to the protocol manager 17 via the SWDIO pin.

The synchronization manager 16 measures the number of power consumption samples between sending the synchronization request and the acknowledgement. This result of this measurement is a measured latency, which is indicative of quality. The lower the latency, the more accurate the synchronization between the trace data and the power consumption samples; the higher the latency, the less accurate the synchronization between the trace data and the power consumption samples.

Figure 3:
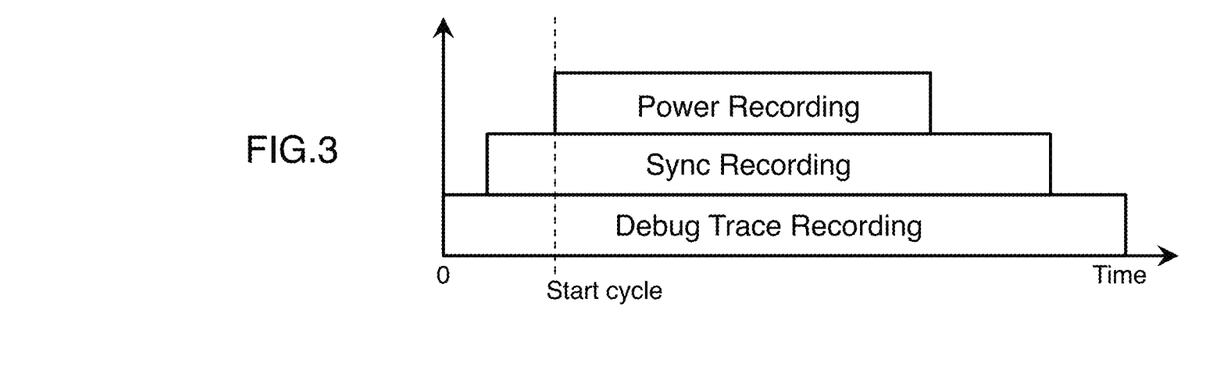
FIG. 3 is a diagram showing the relative start times of debug trace recording, synchronization message recording, and power consumption recording, during debug operations of the debugging system of FIG. 2.

The synchronization requests and the acknowledgements thereof (collectively, synchronization recording) begins after the debug trace recording has begun, as shown in FIG. 3—notice that the sampling of the power consumption PWR is begun by the power acquisition block 15 shortly after the beginning of the synchronization recording, as shown in FIG. 3.

The synchronization request as received at the debug port 16 is then written to a register within the ITM 33. In response to this synchronization request, the ITM 35 generates an ITM message containing the current power acquisition cycle and an associated debug trace time stamp. This ITM message is passed from the ITM 33 to the TPIU 35, which communicates the ITM message to the protocol manager 17 of the debug probe 14 via the SWO pin. These ITM messages are communicated by the protocol manager 17 of the debug probe 14 to the host 12.

Figure 4:
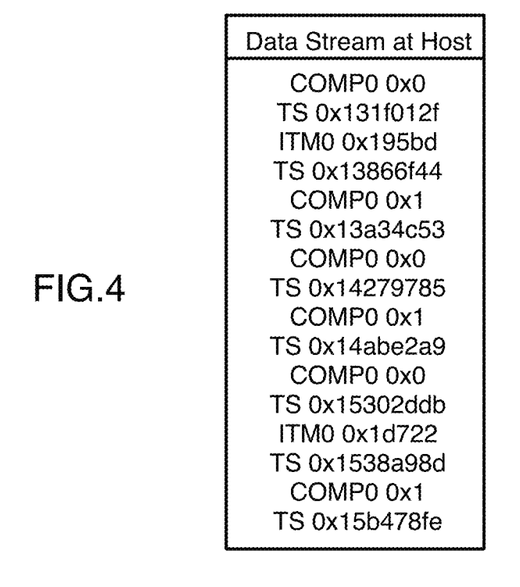
FIG. 4 is a diagram showing a sample data stream received by the host computer during debug operations of the debugging system of FIG. 2.

The protocol manager 17 receives the trace data packets as well as the ITM messages and passes them to the host 12 when received. This means that the data stream from the protocol manager 17 to the host 12 includes the ITM messages from the MCU 20 interleaved with the trace data packets. A sample data stream of the ITM messages (beginning with ITMO, indicating that the ITM message was generated at ITM channel 0) interleaved with the trace data packets (including time stamps TS and debug comparator output COMPO from debug comparator 0) is shown at FIG. 4). For example, observe ITM data packet ITMO 0x1295bd (with its associated time stamp TS 0x13866f44), interleaved between trace data packet COMPO 0x0 (with its associated time stamp TS 0x131f012f) and trade data packet COMPO 0x0 (with its associated time stamp TS 0x13a34c53).

The host 12 reads the trace data/ITM messages as received. Initially after startup, the host 12 utilizes linear regression to calculate the exact time stamp—start time—in the trace data where the power consumption sampling was started by the power acquisition block 16. A ratio between the sampling rate used by the power acquisition block 16 and the processing core 31 frequency (derived from the stream of debug trace time stamp) is calculated. The start point and ratio are used to align the power data and trace data waveforms. A sample aligned power data waveform and trace data waveform can be observed in FIG. 5, illustrating a low-latency case.

Figure 6:
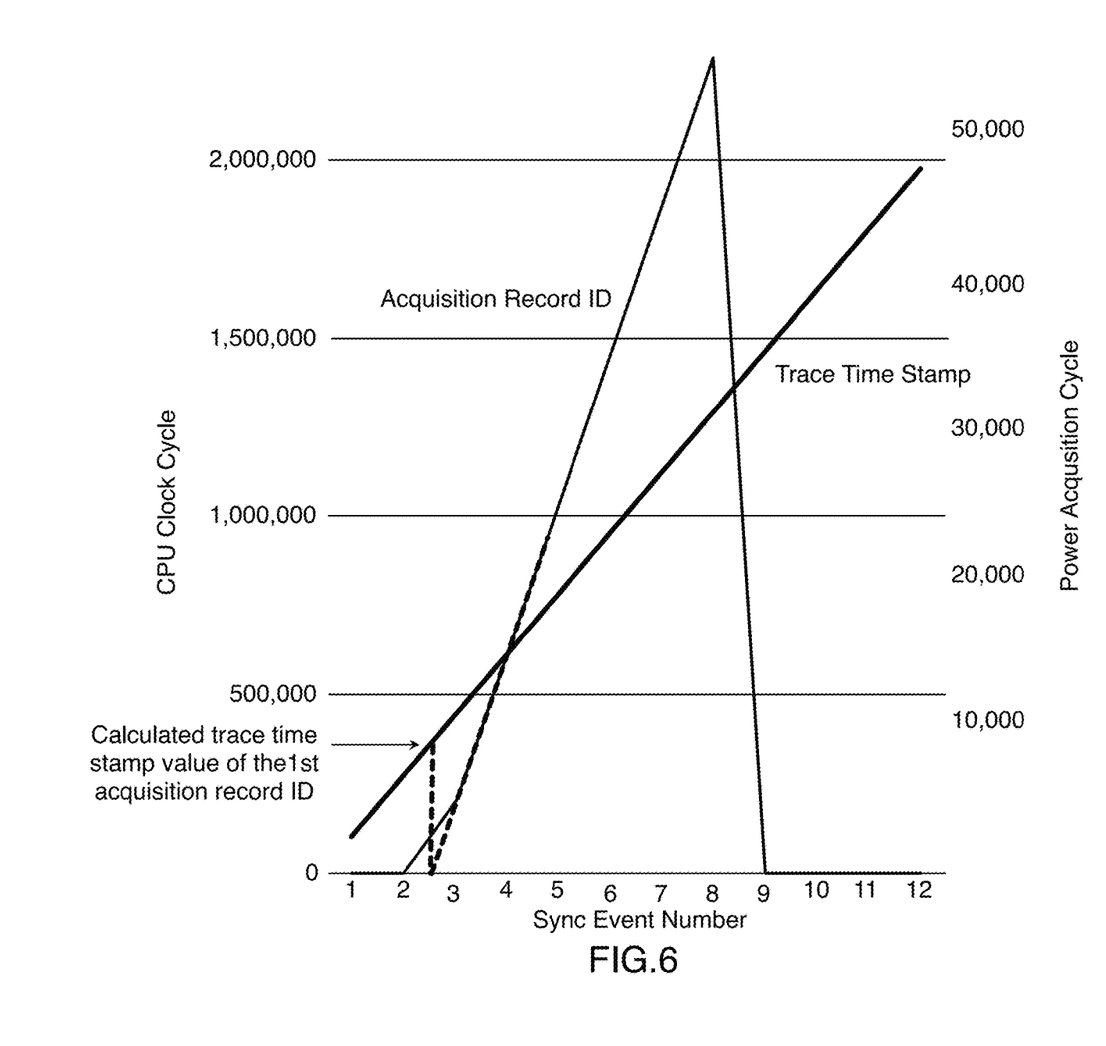
FIG. 6 is a graph showing the alignment between the power acquisition cycle number and debug trace time stamps achieved by the debugging system of FIG. 2 in performing alignment between debug trace data and power acquisition samples.

These operations performed can be observed in the graph FIG. 6. Notice that at the time of the sending of the first synchronization message by the debug probe 14 to the microcontroller 20, the power consumption sampling has not yet begun. This is because, as described above, the generation of the synchronization messages is performed prior to beginning of power consumption sampling. In the example of FIG. 6, by the sending of the third synchronization message, power consumption sampling has begun. Thereafter, for each synchronization message, information for the current power acquisition cycle number and the current processing core cycle is present, and alignment is performed as described above.

Assuming that the latency (described above) is low, such as in the example of FIG. 5, this alignment is sufficiently accurate to allow for precise inferences to be drawn between power consumption and the execution of certain processes/ programs/pieces of code by the host 12.

Figure 7:
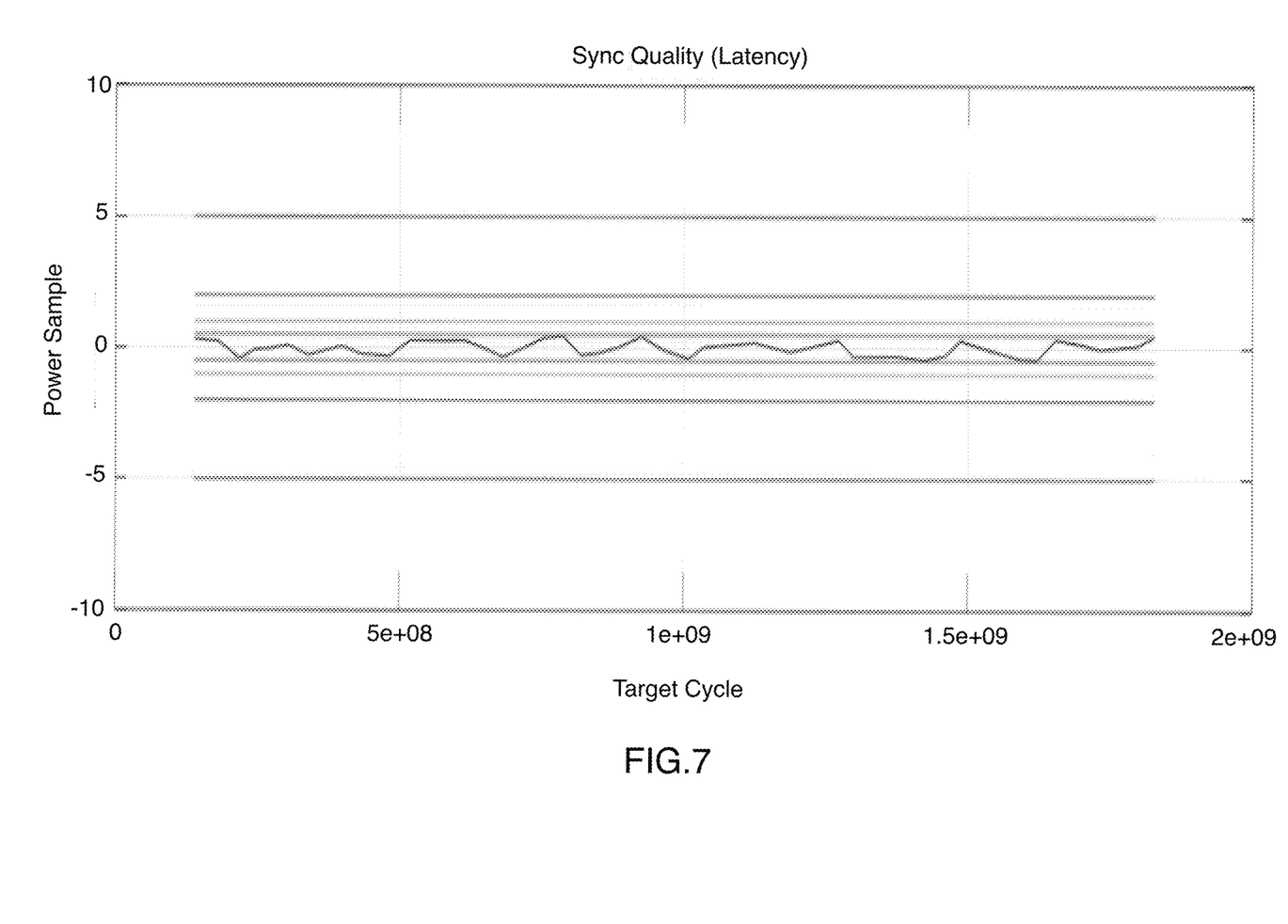
FIG. 7 is a graph showing the measure of synchronization quality achieved by the debugging system of FIG. 2.

Waveforms showing various aspects of operation are contained in FIGS. 7-8. For example, FIG. 7 shows a measure of the synchronization quality, this measure being derivable from latency as described above. As can be observed in this graph, synchronization quality is high, meaning that accurate alignment between the power data and trace data waveforms is achieved using the hardware and operating techniques described above. Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
    a microcontroller including a microprocessor;
    a debug probe; and
    a host configured to, upon startup of the microcontroller, send debug instructions to the debug probe that, when executed by the microcontroller, begin execution of a debug trace within the microcontroller;
    wherein the debug probe is configured to send the debug instructions to the microcontroller;
    wherein the microcontroller is configured to execute the debug trace according to said debug instructions to generate trace data, the trace data including trace data time stamps;
    wherein the debug probe is further configured to: receive a power signal from the host; and sample the power signal and provide the power signal to the microcontroller, with each sampling of the power signal occurring during a different power acquisition cycle;
    wherein the host is further configured to periodically send synchronization requests to the debug probe;
    wherein the debug probe is further configured to, in response to receipt of each synchronization request: retrieve a current power acquisition cycle number; generate an intermediate synchronization request; and send the intermediate synchronization request to the microcontroller;
    wherein the microcontroller is further configured to, in response to receipt of each intermediate synchronization request, send a message to the debug probe, the message including a current execution cycle number of the microprocessor and an associated cycle number time stamp;
    wherein the debug probe is further configured to: send the trace data to the host; send the messages to the host; and send the sampled power signal to the host; and wherein the host is configured to;
   determine a trace data time stamp within the trace data where the sampling of the power signal began;
   derive a frequency of the microprocessor from the trace data;
   determine a ratio between a sampling rate of the power signal and the frequency of the microprocessor; and
   align the trace data and the samples of the power signal based upon the ratio and the trace data time stamp within the trace data where the sampling of the power signal began.

2. The system of claim 1, wherein the debug probe includes a power acquisition circuit that samples the power signal.

3. The system of claim 1, wherein the debug probe includes a protocol manager that retrieves the current power acquisition cycle number, generates the intermediate synchronization request, sends the intermediate synchronization request to the microcontroller; sends the trace data to the host, sends the messages to the host, and sends the sampled power signal to the host.

4. The system of claim 3, wherein the protocol manager sends the intermediate synchronization request to the microcontroller via a serial wire debug (SWD) protocol; wherein the microcontroller sends the message to the debug probe via a UART protocol (SWO) and sends the trace data to the debug probe via the SWD protocol.

5. The system of claim 4, wherein the message is generated within an instrument trace macrocell (ITM) within the microcontroller.

6. The system of claim 3, wherein the debug probe includes a power acquisition circuit that samples the power signal; wherein the microcontroller is further configured to, upon receipt of each intermediate synchronization request, send a request acknowledgement to the debug probe; wherein the protocol manager is further configured to measure a number of power acquisition cycles between sending of each intermediate synchronization request and receipt of each request acknowledgement, and determine a latency based thereupon; wherein the latency is indicative of accuracy in the alignment between the trace data and the samples of the power signal.

7. A method of aligning trace data and power consumption data in a debugging system, the method comprising:
   send debug instructions to a microcontroller within the debugging system, the debug instructions, when executed by the microcontroller, begin execution of a debug trace;
   receive a power signal from a host within the debugging system;
   sample the power signal and provide the power signal to the microcontroller, with each sampling of the power signal occurring during a different power acquisition cycle;
   in response to receipt of each of a number of periodic synchronization requests: retrieve a current power acquisition cycle number; generate an intermediate synchronization request; and send the intermediate synchronization request to the microcontroller;
   receive trace data from the microcontroller, the trace data including trace data time stamps;
   receive from the microcontroller, in response to the sending of each intermediate synchronization request, a message, the message including a current execution cycle number of a microprocessor within the microcontroller and an associated cycle number time stamp; and
   send the trace data to the host, send the messages to the host, and send the sampled power signal to the host so that the host aligns the trace data and the samples of the power signal based upon a trace data time stamp within the trace data where the sampling of the power signal began and a ratio between a sampling rate of the power signal and a frequency of the microprocessor.

8. The method of claim 7, further comprising deriving the frequency of the microprocessor from the trace data.

9. The method of claim 7, further comprising;
   in response to the sending of each intermediate synchronization request to the microcontroller, receive a request acknowledgement;
   measure a number of power acquisition cycles between the sending of each intermediate synchronization request and receipt of each request acknowledgement, and determine a latency based thereupon; and
   determine accuracy in the alignment between the trace data and the samples of the power signal from the latency.

10. A method of aligning trace data and power consumption data in a debugging system, the method comprising:
   upon startup of a microcontroller within the debugging system, send debug instructions from a host within the debugging system to a debug probe within the debugging system that, when executed by the microcontroller, begin execution of a debug trace;
   transmit the debug instructions from the debug probe to the microcontroller;
   execute the debug trace at the microcontroller according to said debug instructions to generate trace data, the trace data including trace data time stamps;
   receive a power signal, at the debug probe, from the host;
   sample the power signal at the debug probe and provide the power signal to the microcontroller, with each sampling of the power signal occurring during a different power acquisition cycle;
   periodically send synchronization requests from the host to the debug probe;
   in response to receipt of each synchronization request at the debug probe: retrieve a current power acquisition cycle number; generate an intermediate synchronization request; and send the intermediate synchronization request from the debug probe to the microcontroller;
   in response to receipt of each intermediate synchronization request at the microcontroller, send a message to the debug probe, the message including a current execution cycle number of a microprocessor within the microcontroller and an associated cycle number time stamp;
   send the trace data from the debug probe to the host;
   send the messages from the debug probe to the host;
   send the sampled power signal from the debug probe to the host;
   determine a trace data time stamp within the trace data where the sampling of the power signal began, at the host;
   derive a frequency of the microprocessor from the trace data, at the host;
   determine a ratio between a sampling rate of the power signal and the frequency of the microprocessor, at the host; and
   align the trace data and the samples of the power signal based upon the ratio and the trace data time stamp within the trace data where the sampling of the power signal began, at the host.

11. The method of claim 10, further comprising:
upon receipt of each intermediate synchronization request at the microcontroller, send a request acknowledgement to the debug probe; and
measure a number of power acquisition cycles between sending of each intermediate synchronization request and receipt of each request acknowledgement at the debug probe, and determine a latency based thereupon;
wherein the latency is indicative of accuracy in the alignment between the trace data and the samples of the power signal.

12. A system, comprising:
a microcontroller including a microprocessor;
a debug probe; and
a host;
wherein the microcontroller is configured to execute a debug trace to generate trace data, the trace data including trace data time stamps;
wherein the debug probe is further configured to: receive a power signal from the host; and sample the power signal and provide the power signal to the microcontroller, with each sampling of the power signal occurring during a different power acquisition cycle;
wherein the host is further configured to periodically send synchronization requests to the debug probe;
wherein the debug probe is further configured to, in response to receipt of each synchronization request: retrieve a current power acquisition cycle number; generate an intermediate synchronization request; and send the intermediate synchronization request to the microcontroller;
wherein the microcontroller is further configured to, in response to receipt of each intermediate synchronization request, send a message to the debug probe, the message including a current execution cycle number of the microprocessor and an associated cycle number time stamp;
wherein the debug probe is further configured to: send the trace data to the host; send the messages to the host; and send the sampled power signal to the host; and
wherein the host is configured to align the trace data and the samples of the power signal based upon a trace data time stamp within the trace data where the sampling of the power signal began, the trace data, and a sampling rate of the power signal.

13. The system of claim 12, wherein host is configured to align the trace data and the samples of the power signal based upon a ratio between a sampling rate of the power signal and a frequency of the microprocessor and based upon the trace data time stamp within the trace data where the sampling of the power signal began.

14. The system of claim 12, wherein the debug probe includes a power acquisition circuit that samples the power signal.

15. The system of claim 12, wherein the debug probe includes a protocol manager that retrieves the current power acquisition cycle number, generates the intermediate synchronization request, sends the intermediate synchronization request to the microcontroller; sends the trace data to the host, sends the messages to the host, and sends the sampled power signal to the host.

16. The system of claim 15, wherein the protocol manager sends the intermediate synchronization request to the microcontroller via a serial wire debug (SWD) protocol; wherein the microcontroller sends the message to the debug probe via a UART protocol (SWO) and sends the trace data to the debug probe via the SWD protocol.

17. The system of claim 16, wherein the message is generated within an instrument trace macrocell (ITM) within the microcontroller.

18. The system of claim 15, wherein the debug probe includes a power acquisition circuit that samples the power signal; wherein the microcontroller is further configured to, upon receipt of each intermediate synchronization request, send a request acknowledgement to the debug probe; wherein the protocol manager is further configured to measure a number of power acquisition cycles between sending of each intermediate synchronization request and receipt of each request acknowledgement, and determine a latency based thereupon; wherein the latency is indicative of accuracy in the alignment between the trace data and the samples of the power signal.

* * * * *

UNITED STATES PATENT AND TRADEMARK OFFICE
CERTIFICATE OF CORRECTION

| | |
|---|---|
| PATENT NO. | : 12,038,801 B2 |
| APPLICATION NO. | : 18/081011 |
| DATED | : July 16, 2024 |
| INVENTOR(S) | : Sylvain Chavagnat et al. |

It is certified that error appears in the above-identified patent and that said Letters Patent is hereby corrected as shown below:

In the Specification

At Column 7, Lines 46-47, please replace [[ COMPO 0x0 ]] with -- COMPO 0x1 --.

Signed and Sealed this
Twenty-ninth Day of October, 2024

Katherine Kelly Vidal
*Director of the United States Patent and Trademark Office*